(12) United States Patent
Schubert et al.

(10) Patent No.: US 10,274,173 B2
(45) Date of Patent: Apr. 30, 2019

(54) MODULAR LED LIGHTING FIXTURE

(71) Applicant: LSI Industries, Inc., Cincinnati, OH (US)

(72) Inventors: Travis Schubert, Norfolk, VA (US); John D. Boyer, Lebanon, OH (US); Travis Wright, Cincinnati, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

(21) Appl. No.: 15/940,179

(22) Filed: Mar. 29, 2018

(65) Prior Publication Data

US 2018/0283659 A1 Oct. 4, 2018

Related U.S. Application Data

(60) Provisional application No. 62/478,912, filed on Mar. 30, 2017.

(51) Int. Cl.
| | |
|---|---|
| *F21V 17/16* | (2006.01) |
| *F21V 8/00* | (2006.01) |
| *F21V 7/00* | (2006.01) |
| *F21S 8/04* | (2006.01) |
| *F21Y 103/10* | (2016.01) |
| *F21Y 115/10* | (2016.01) |
| *F21V 7/05* | (2006.01) |
| *F21Y 105/00* | (2016.01) |
| *F21Y 107/00* | (2016.01) |

(52) U.S. Cl.
CPC .............. *F21V 17/164* (2013.01); *F21S 8/04* (2013.01); *F21V 7/005* (2013.01); *F21V 7/0016* (2013.01); *G02B 6/0081* (2013.01); *F21V 7/05* (2013.01); *F21Y 2103/10* (2016.08); *F21Y 2105/00* (2013.01); *F21Y 2107/00* (2016.08); *F21Y 2115/10* (2016.08); *G02B 6/0075* (2013.01)

(58) Field of Classification Search
CPC .......... F21V 17/164; F21V 7/005; F21V 7/05; F21V 7/0016; G02B 6/0081; G02B 6/0075; F21Y 2115/10; F21Y 2103/10; F21Y 2107/00; F21Y 2105/00; F21S 8/04
See application file for complete search history.

(56) References Cited

U.S. PATENT DOCUMENTS

| | | | |
|---|---|---|---|
| 8,556,451 B1 * | 10/2013 | Wilkinson | F21S 2/00 362/217.01 |
| 10,067,284 B1 * | 9/2018 | DiFelice | G02B 6/0085 |

(Continued)

*Primary Examiner* — Elmito Breval
*Assistant Examiner* — Glenn D Zimmerman
(74) *Attorney, Agent, or Firm* — Wood Herron & Evans LLP

(57) ABSTRACT

A modular lighting fixture includes an elongate center support member defining a channel. At least one reflector panel is coupled with the center support member and extends laterally outward therefrom. The lighting fixture further includes at least one light guide having a first edge and an oppositely disposed second edge. The first edge of the light guide is mechanically coupled with the center support member. The light guide may have a curved cross-sectional shape in a plane perpendicular to a longitudinal direction of the center support member. At least one light emitting diode (LED) is disposed adjacent the first edge of the light guide, whereby light produced by the LED is directed through the light guide toward the second edge.

12 Claims, 5 Drawing Sheets

(56) References Cited

U.S. PATENT DOCUMENTS

2015/0138829 A1\* 5/2015 Jang ................. F21S 8/061
362/606
2018/0113244 A1\* 4/2018 Vasylyev ............. G02B 6/0036

\* cited by examiner

MODULAR LED LIGHTING FIXTURE

CROSS-REFERENCE

This application claims the benefit of U.S. Provisional Patent Application Ser. No. 62/478,912, filed Mar. 30, 2017, the disclosure of which is incorporated by reference herein in its entirety

TECHNICAL FIELD

The present invention relates generally to lighting fixtures and, more particularly, to a modular lighting fixture suitable for use with light emitting diodes (LEDs).

BACKGROUND

Many lighting applications utilize lighting fixtures that are configured to be suspended from ceilings or which may be recessed into a ceiling to provide illumination of an interior space. Manufacturers commonly utilize metal to form the housing and other structural components of such lighting fixtures. One drawback to the use of metal for lighting fixtures is that it is difficult and costly to provide the housing and structural components in complex shapes. For example, complex configurations may require forming portions of the fixture as separate pieces that are subsequently joined together, thereby adding to the manufacturing process and increasing weight. Moreover, metal structures create interference with wireless communication signals that are increasingly being used to control lighting and for other purposes. To address such interference, external antennas may be required, however, these are generally bulky, fragile during packaging and shipping, and may not provide an aesthetically pleasing appearance. Similarly, the use of metal in lighting fixtures presents limitations when it is desired to include sensors, such as motion sensors, into the fixtures. The incorporation of such sensors into lighting fixtures often requires additional parts and fasteners and disrupts the aesthetic appearance. Accordingly, there is a need for improved lighting fixtures that address these and other drawbacks of prior lighting fixtures.

SUMMARY

The present invention overcomes the foregoing and other shortcomings and drawbacks of lighting fixtures heretofore known for use in suitable various residential and commercial environments. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, an exemplary modular lighting fixture is provided. The modular lighting fixture includes an elongate center support member defining a channel. At least one reflector panel is coupled with the center support member and extends laterally outward therefrom. The lighting fixture further includes at least one light guide having a first edge and an oppositely disposed second edge. The first edge of the light guide is mechanically coupled with the center support member. The light guide may have a curved cross-sectional shape in a plane perpendicular to a longitudinal direction of the center support member. At least one light emitting diode (LED) is disposed adjacent the first edge of the light guide, whereby light produced by the LED is directed through the light guide toward the second edge.

The above and other objects and advantages of the present invention shall be made apparent from the accompanying drawings and the description thereof.

DETAILED DESCRIPTION

Figure 1:
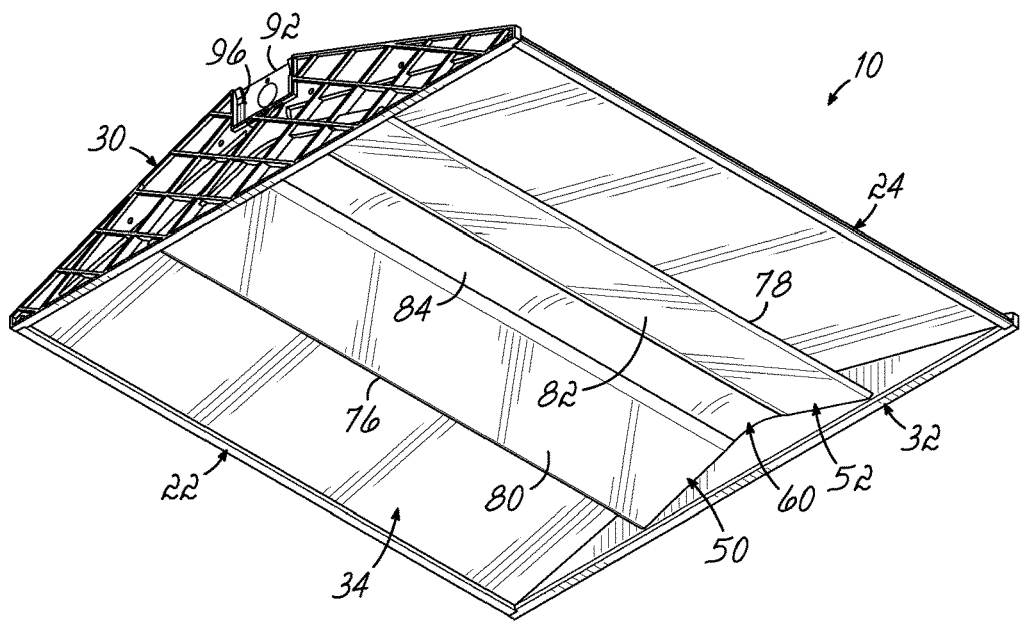
FIG. 1 is a bottom perspective view of an exemplary lighting fixture in accordance with the principles of the present disclosure.
Figure 2:
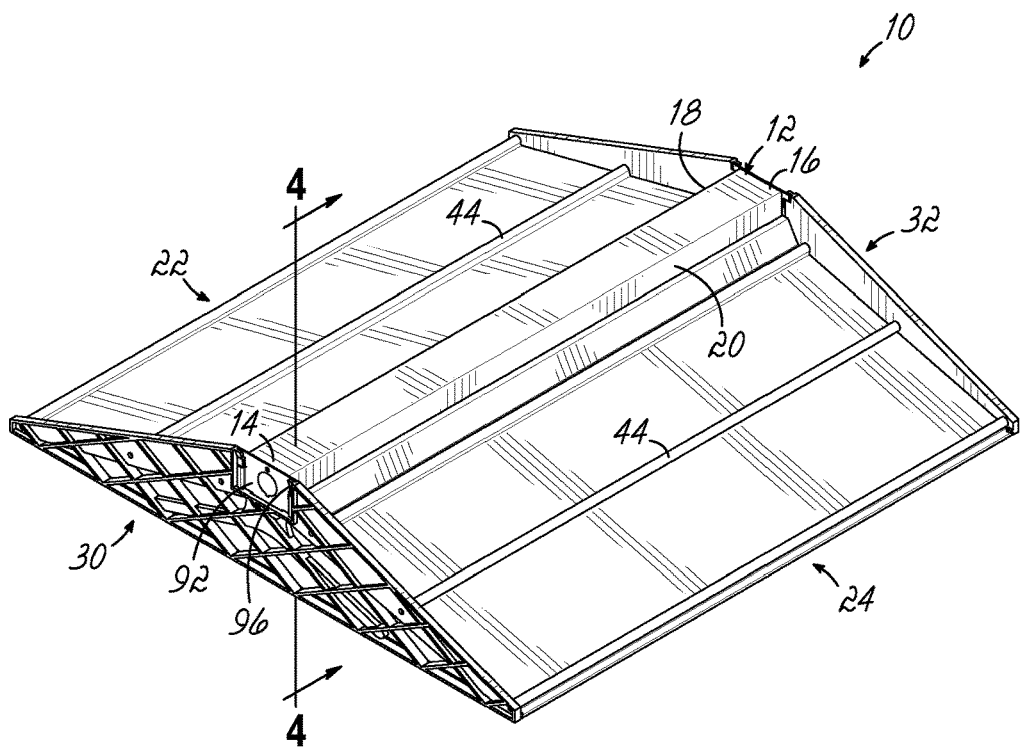
FIG. 2 is a top perspective view of the lighting fixture of FIG. 1.

FIGS. 1-4 depict an exemplary lighting fixture assembly 10 in accordance with the principles of the present disclosure. The lighting fixture assembly 10 includes a generally elongate center support member 12 having first and second longitudinal ends 14, 16, and first and second oppositely disposed lateral sides 18, 20. First and second reflector panels 22, 24 are coupled along their first side edges 26, 28 to the respective first and second lateral sides 18, 20 of the elongate center support member 12. In the embodiment shown, the reflector panels 22, 24 have generally rectangular shapes and extend laterally outwardly from the center support member 12. First and second end caps 30, 32 are coupled with the first and second reflector panels 22, 24, adjacent the first and second longitudinal ends 14, 16 of the center support member 12, and cooperate with the reflector panels 22, 24 to define a partially enclosed space 34 for receiving the lighting components of the fixture assembly 10.

The center support member 12, the first and second reflector panels 22, 24, and the first and second end caps 30, 32 may include cooperating coupling structure configured to facilitate quick and easy assembly of the fixture components without the need for separate fastening elements. With continued reference to FIGS. 1-4, and referring further to FIG. 5, the exemplary coupling structure on the center support member 12 and the reflector panels 22, 24 define slots and complimentarily-shaped lip portions configured to permit sliding assembly of the reflector panels 22, 24 with the center support member 12. In the embodiment shown, coupling structure 40 on the center support member 12 includes first and second oppositely disposed slots 40a, 40b adjacent the first and second lateral sides 18, 20. The coupling structure 42 on the first and second reflector panels 22, 24 include first and second confronting lip portions 42a, 42b sized and shaped complimentary to the first and second slots 40a, 40b of the coupling structure 40 on the center support member 12, whereby the first and second reflector panels 22, 24 may be slidingly coupled with the center support member 12 by engaging the lip portions 42a, 42b within the respective slots 40a, 40b These configurations of the center support member and the reflector panels enables these components to be formed by extrusion processes.

In the embodiment shown, the first and second end caps 30, 32 of the lighting fixture assembly 10 may include coupling structure in the form of one or more ledges 36 configured to receive longitudinal end portions of the reflector panels 22, 24, whereby the end caps 30, 32 may be coupled with the reflector panels 22, 24 by a snap-fit, press-fit, or sliding assembly without the use of additional fastener elements. In the embodiment shown, the reflector panels 22, 24 may further include one or more additional coupling features configured to engage complementarily-shaped coupling features on the end caps 30, 32 to thereby provide an interlocking or snap-fit engagement between the reflector panels 22, 24 and the end caps 30, 32 that facilitates retaining the end caps 30, 32 on the reflector panels 22, 24 in the assembled condition. In the embodiment shown, the additional coupling features on the reflector panels 22, 24 comprise hook-shaped arms 44 defining respective slots 44*a*, and the coupling features on the end caps 30, 32 comprise projections 46 sized and shaped complimentary to the slots 44*a* such that the projections 46 may be snap-fit into the respective slots 44*a* to thereby secure the end caps 30, 32 with the reflector panels 22, 24. The hook-shaped arms 44 may extend along the longitudinal lengths of the reflector panels 22, 24, or at least a portion of the longitudinal lengths, to provide additional structural rigidity to the reflector panels 22, 24. In the embodiment shown, the configuration of the end caps 30, 32 permits forming the end caps from polymeric materials in a molding process, such as by injection molding for example.

While the center support member 12, the reflector panels 22, 24, and the end caps 30, 32 have been shown and described herein as being suitable for manufacture by extrusion or molding processes, it will be appreciated that these components may be formed by various other methods as may be desired. Moreover, while the coupling structure on the center support member 12 has been shown and described as including slots and the coupling structure on the reflector panels 22, 24 has been shown and described as including lip portions, it will be appreciated that the coupling structure on the center support member 12 may alternatively comprise lip portions configured to be received in complimentarily-shaped slots on the reflector panels 22, 24, or that these components may comprise various other suitable complimentarily-shaped structures that facilitate assembly without the need for additional fastener elements.

The lighting fixture assembly 10 further includes one or more light guides supported within the partially enclosed space 34. In the embodiment shown, first and second light guides 50, 52 are coupled with the center support member 12. First edges 54, 56 of the light guides 50, 52 include coupling structure 58 configured to engage the complimentarily-shaped portions of the coupling structure 40 of the center support member 12, adjacent the respective first and second lateral sides 18, 20. In the embodiment shown, the coupling structure 58 on the first edges 54, 56 of the light guides include longitudinally extending projections 58*a* that may be received into complimentarily-shaped slots 40*c* in the coupling structure 40 of the center support member 12, whereby the first and second light guides 50, 52 may be slidingly assembled with the center support member 12 without requiring additional fastener elements. The end caps 30, 32 may also include one or more ledges 38 configured to engage longitudinal end portions of the light guides 50, 52, whereby the end caps may be coupled with the light guides 50, 52, such as by a snap-fit, press-fit, or sliding assembly for example, without requiring the use of fastener elements.

The lighting fixture assembly may further include a spacer bracket 60 disposed between the first and second light guides 50, 52. The coupling structure 58 on the respective light guides 50, 52 is configured to engage complimentarily-shaped coupling structure 62 on the spacer bracket 60. For example, in the embodiment shown, the coupling structure 58 on the light guides 50, 52 and the coupling structure 62 on the spacer bracket 60 comprise complimentarily, interlocking, J-shaped portions configured to interengage with one another, whereby the spacer bracket 60 may be slidingly coupled with the first and second light guides 50, 52 without requiring additional fastener elements. The configuration of the light guides 50, 52 and the spacer bracket 60 allows these components to be formed by extrusion processes. Moreover, extruding the center support member 12, the reflector panels 22, 24, the light guides 50, 52, and the spacer bracket 60 allows the lighting fixture assembly 10 to be provided in various lengths, as may be desired to suit a particular application, without requiring additional tooling in order to produce the many various lengths which may be desired. Specifically, the center support member 12, reflector panels 22, 24, light guides 50, 52, and spacer bracket 60 may be extruded and cut to any desired longitudinal length, whereafter the components may be coupled together as described above, and first and second end caps 30, 32 may be added to obtain the modular lighting fixture assembly 10.

Figure 3:
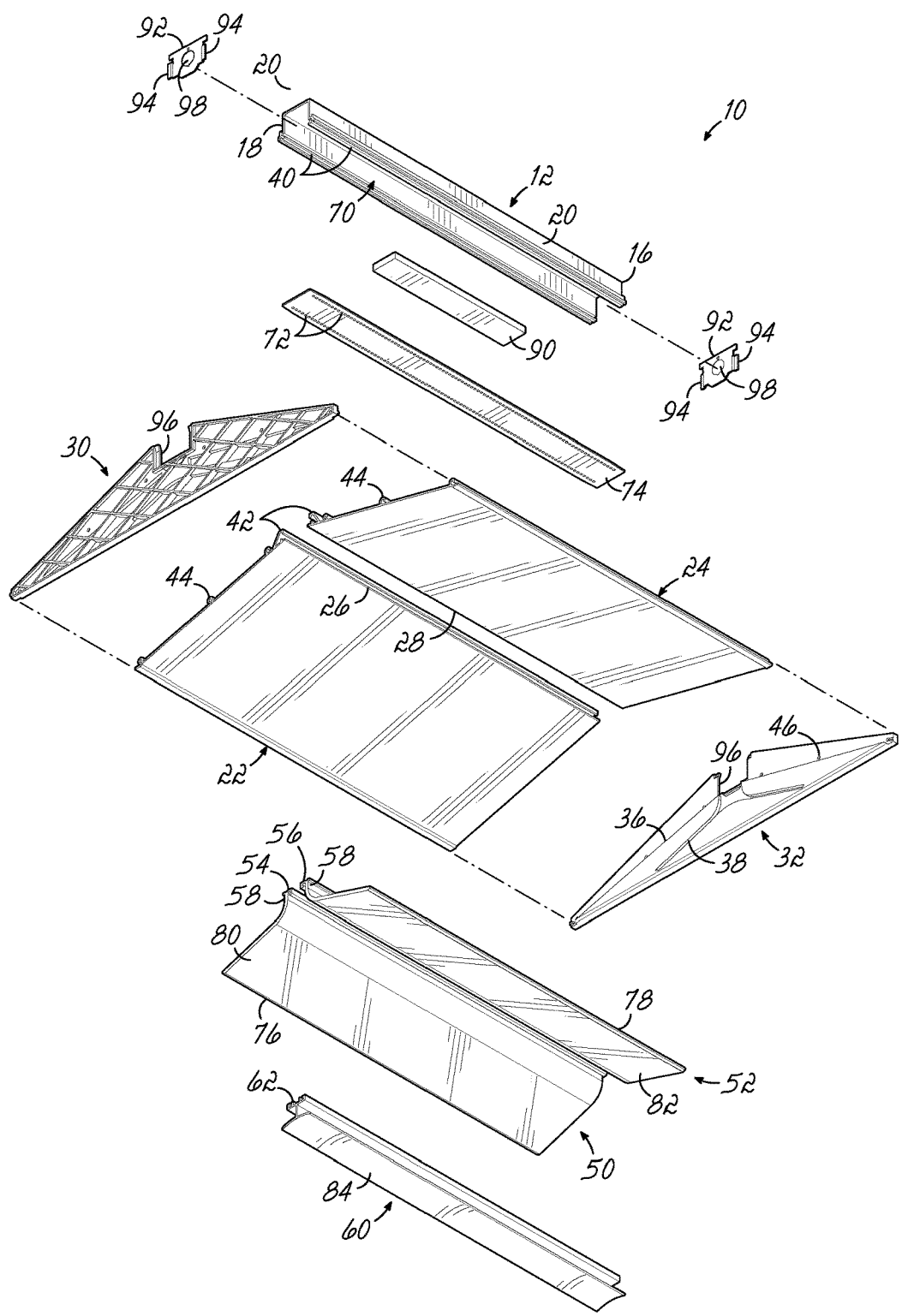
FIG. 3 is an exploded perspective view of the lighting fixture of FIG. 1.
Figure 4:
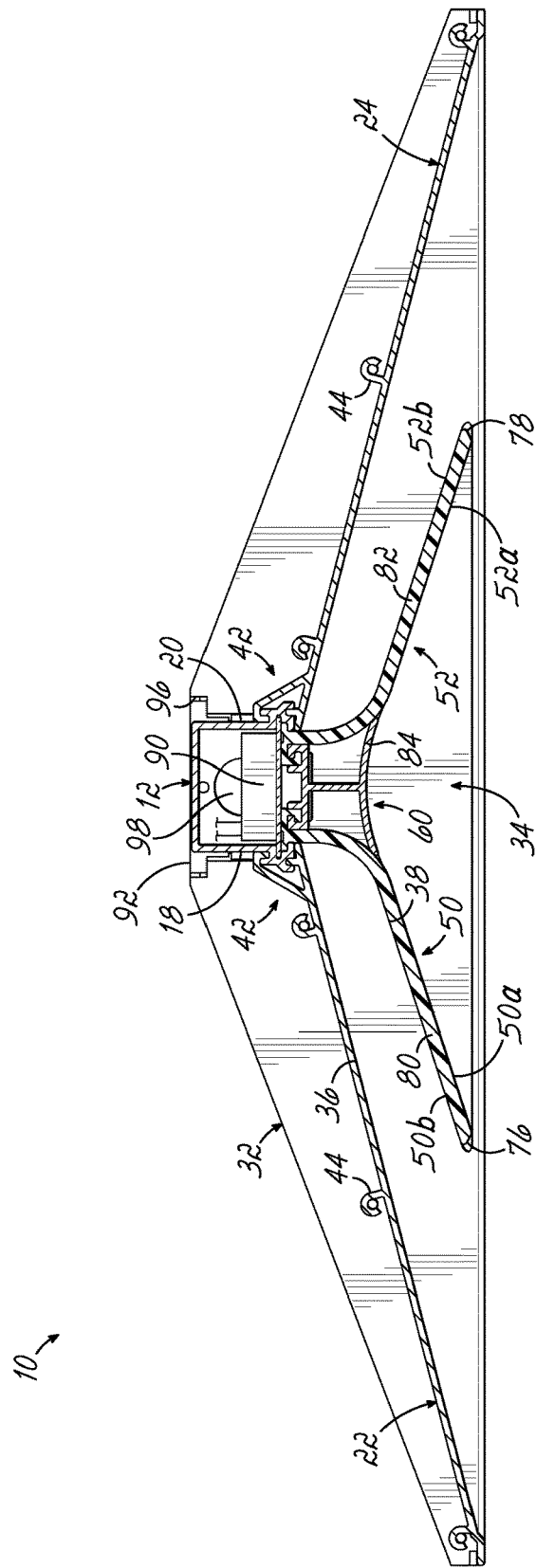
FIG. 4 is a cross-sectional view taken along line 4-4 of FIG. 2.
Figure 5:
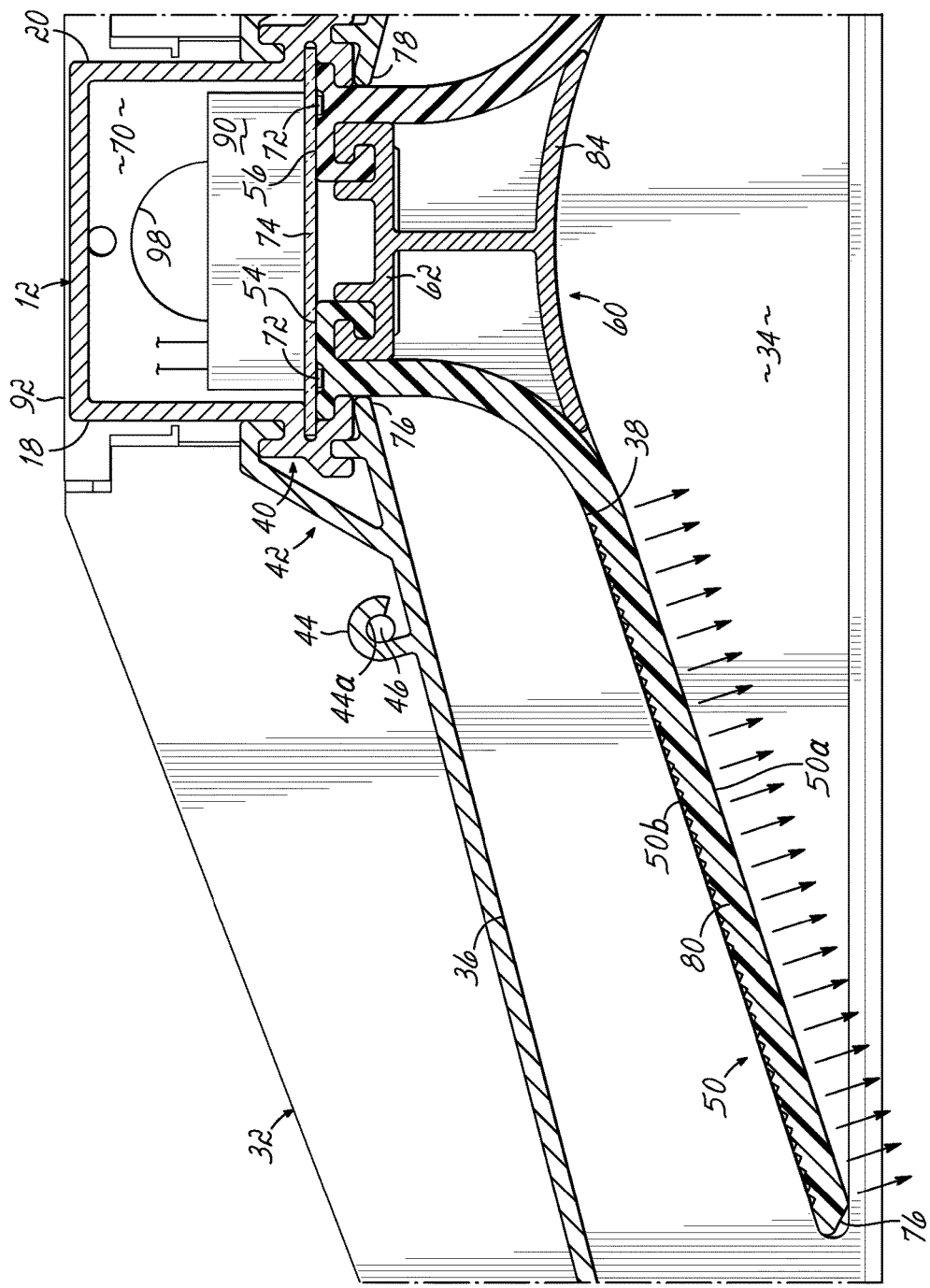
FIG. 5 is an enlarged detail view of the cross-section of FIG. 4.
Figure 6:
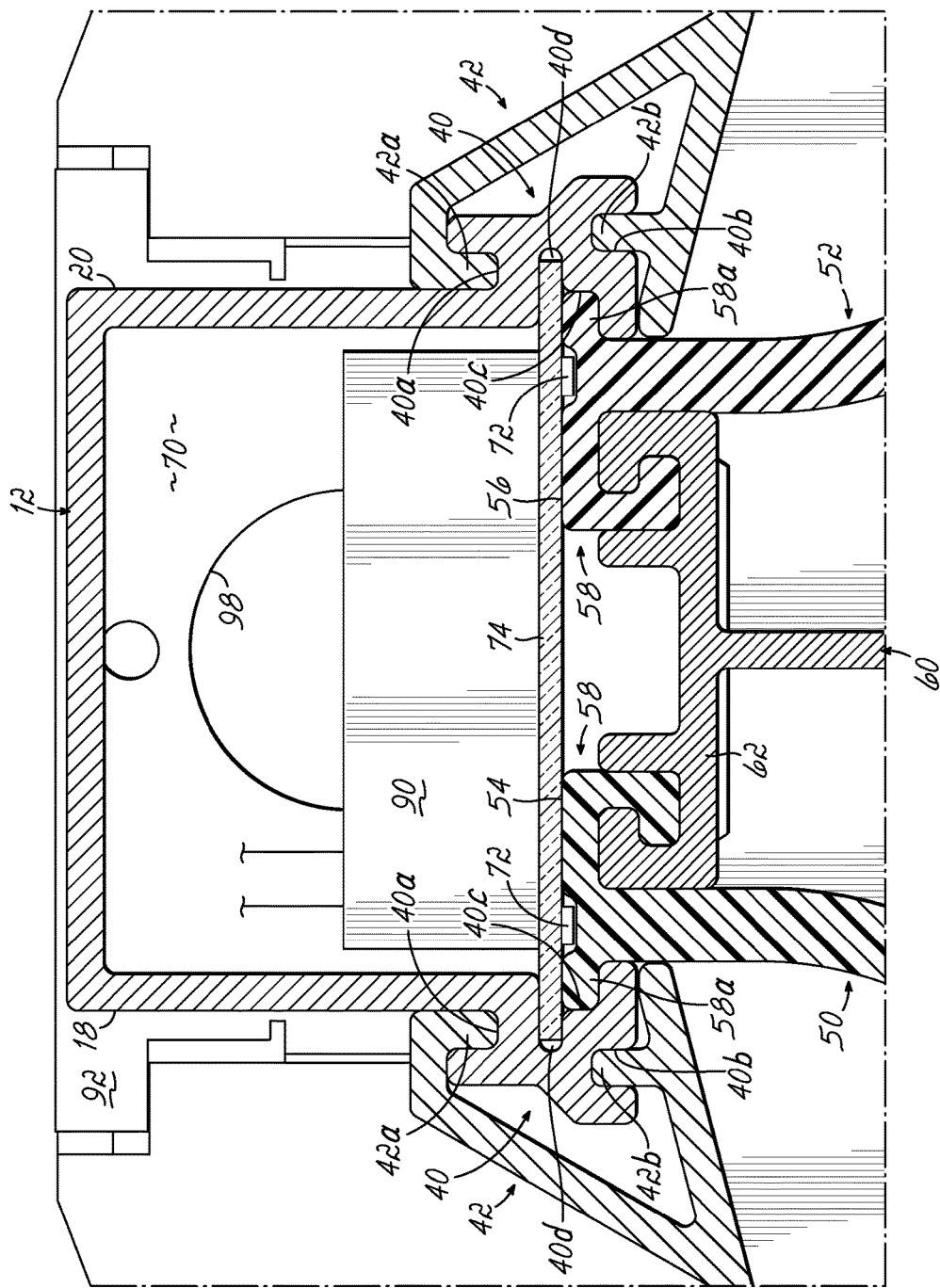
FIG. 6 is a further enlarged detail view of the cross-section illustrated in FIG. 5, depicting an exemplary coupling of components.

With continued reference to FIGS. 3-5, the elongate center support member 12 defines a channel 70 for receiving and housing solid state lighting sources, electronics, and other components of the lighting fixture assembly 10. In the embodiment shown, the lighting elements comprise a plurality of LEDs 72 supported on a printed circuit board 74 configured to be received within the channel 70. The coupling structure 40 of the center support member 12 further includes elongate grooves 40*d* extending along the longitudinal direction, whereby the printed circuit board 74 may be slidingly received and retained within the channel 70. The LEDs 72 are arranged on the printed circuit board 74 such that they are positioned adjacent the first ends 54, 56 of the light guides 50, 52, whereby light emitted from the LEDs 72 is directed through the light guides 50, 52 toward second, oppositely disposed second ends 76, 78 of the light guides 50, 52. The light guides 50, 52 extend downwardly from the center support member 12 and may have curved cross-sections such that generally planar portions 80, 82 of the light guides 50, 52 extend alongside the first and second reflector panels 22, 24, respectively. Various surface treatments may be applied to the first side surfaces 50*a*, 52*a* and/or second side surfaces 50*b*, 52*b* of the light guides 50, 52 to define lens surfaces for extracting light from the light guides 50, 52 as may be desired to provide direct, indirect, or a combination of direct and indirect lighting to the space beneath the lighting fixture assembly 10.

For direct lighting, the first or second side surfaces 50*a*, 50*b*, 52*a*, 52*b* of the light guides 50, 52 may be treated such that light extracted from the light guides 50, 52 is directed outwardly from the first side surfaces 50*a*, 52*a*. For indirect lighting, the first or second side surfaces 50*a*, 50*b*, 52*a*, 52*b* of the light guides 50, 52 are treated such that light extracted from the light guides 50, 52 is directed toward a respective reflector panel 22, 24. Accordingly, the surfaces of the reflector panels 22, 24 that face the light guides 50, 52 may be treated to reflect light emitted from the light guides 50, 52. Surface treatment may include providing reflective coatings or materials applied to the surfaces of the reflector panels 22, 24, providing one or more textures on the desired surfaces, or any combination thereof. The spacer bracket 60 may include a wall portion 84 positioned between the first and second light guides 50, 52 in the assembled configuration of the fixture assembly 10. In one embodiment, the surface of the wall portion 84 that faces away from the center support member 12 may be treated to reflect light emitted from the light guides 50, 52.

The lighting fixture assembly 10 may further include one or more drivers 90 and other electronic components useful for operating the LEDs 72 housed within the channel 70. The driver 90 may be mounted to the printed circuit board 74, or may be coupled with the center support member 12. End plates 92 may be provided adjacent the first and second longitudinal ends 14, 16 of the center support member 12 to at least partially enclose the channel 70. Coupling structure 94 may be provided on the end plates 92, and may be sized and shaped to engage complimentarily-shaped coupling structure 96 on the end caps 30, 32. Apertures 98 may be provided in the end plates 92 to facilitate routing wires or other items out from the channel 70.

The lighting fixture assembly 10 may further include electronic components configured to send and/or receive wireless signals. Because the fixture assembly 10 is formed from polymeric components, these wireless electronic devices may be located generally anywhere within the fixture assembly 10, including within the channel 70 of the center support member 12. The lighting fixture assembly 10 may also include various sensors integrated within the structure. Forming the components from plastic material enables mounting locations to be integrated within the design without affecting the aesthetic appearance of the lighting fixture assembly. For example, the first or second end caps may include support features for locating one or more sensors thereon.

While the present invention has been illustrated by the description of a specific embodiments thereof, and while the embodiment has been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details shown and described. Accordingly, departures may be made from such details without departing from the scope of the general inventive concept.

What is claimed is:

1. A modular light fixture, comprising:
an elongate center support member defining a channel;
at least one reflector panel coupled with the center support member and extending laterally outward therefrom;
at least one light guide having a first edge and an oppositely disposed second edge, the first edge being mechanically coupled with the center support member;
the light guide having a curved cross-sectional shape in a plane perpendicular to a longitudinal direction of the center support member; and
at least one light emitting diode (LED) disposed adjacent the first edge,
wherein the at least one reflector panel and the at least one light guide comprise discrete components each individually coupled to the center support member.

2. The modular light fixture of claim 1, wherein at least one of the at least one reflector panel or the at least one light guide is mechanically coupled with the center support member by at least one of:
a sliding engagement;
a snap-fit engagement; or
a press-fit engagement.

3. The modular light fixture of claim 1, wherein the at least one light guide extends outwardly from the center support member adjacent the at least one reflector panel.

4. The modular light fixture of claim 1, comprising first and second reflector panels disposed on opposite lateral sides of the center support member, and first and second light guides.

5. The modular light fixture of claim 1, further comprising:
at least one circuit board disposed within the channel;
the at least one LED supported on the at least one circuit board.

6. The modular light fixture of claim 1, wherein the light guide is extruded to define the curved shape.

7. The modular light fixture of claim 1, wherein:
the at least one light guide is configured to direct light from a lens surface in a direction opposite the reflector panel.

8. The modular light fixture of claim 1, wherein:
the at least one light guide is configured to direct light from lens surfaces in directions toward and away from the reflector panel.

9. The modular light fixture of claim 1, further comprising:
at least one end cap disposed on a longitudinal free end of the center support member and coupled with the at least one reflector panel.

10. The modular light fixture of claim 4, further comprising a spacer member disposed between the first and second light guides.

11. The modular light fixture of claim 7, further comprising:
a reflective material disposed on at least a portion of the reflector panel that faces the light guide.

12. A modular light fixture, comprising:
an elongate center support member defining a channel;
at least one reflector panel coupled with the center support member and extending laterally outward therefrom;
at least one light guide having a first edge and an oppositely disposed second edge, the first edge including first coupling structure;
second coupling structure on the center support member, the second coupling structure having a shape complimentary to the first coupling structure and engaging the first coupling structure such that the at least one light guide is mechanically coupled with the center support member by at least one of:
a sliding engagement,
a snap-fit engagement, or
a press-fit engagement; and
at least one light emitting diode (LED) disposed adjacent the first edge,
wherein the at least one reflector panel and the at least one light guide comprise discrete components each individually coupled to the center support member.

* * * * *

UNITED STATES PATENT AND TRADEMARK OFFICE
CERTIFICATE OF CORRECTION

PATENT NO. : 10,274,173 B2
APPLICATION NO. : 15/940179
DATED : April 30, 2019
INVENTOR(S) : Travis Schubert et al.

Page 1 of 2

It is certified that error appears in the above-identified patent and that said Letters Patent is hereby corrected as shown below:

In the Specification

In Column 2, Line 54, change "slots and complimentarily-shaped lip portions" to --slots and complementarily-shaped lip portions--.

In Column 2, Line 62, change "sized and shaped complimentary to the first and second slots" to --sized and shaped complementary to the first and second slots--.

In Column 3, Line 22, change "sized and shaped complimentary to the slots" to --sized and shaped complementary to the slots--.

In Column 3, Lines 44-47, change "complimentarily-shaped slots on the reflector panels 22, 24, or that these components may comprise various other suitable complimentarily-shaped structures" to --complementarily-shaped slots on the reflector panels 22, 24, or that these components may comprise various other suitable complementarily-shaped structures--.

In Column 3, Lines 54-55, change "configured to engage the complimentarily-shaped portions" to --configured to engage the complementarily-shaped portions--.

In Column 3, Line 60, change "may be received into complimentarily-shaped slots" to --may be received into complementarily-shaped slots--.

In Column 4, Line 7, change "is configured to engage complimentarily-shaped coupling structure" to --is configured to engage complementarily-shaped coupling structure--.

In Column 4, Line 11, change "on the spacer bracket 60 comprise complimentarily," to --on the spacer bracket 60 comprise complementarily,--.

In Column 5, Line 19, change "and shaped to engage complimentarily-shaped coupling" to --and shaped to engage complementarily-shaped coupling--.

Signed and Sealed this
Sixteenth Day of July, 2019

Andrei Iancu
*Director of the United States Patent and Trademark Office*

In Column 5, Lines 37-39, change "While the present invention has been illustrated by the description of a specific embodiments thereof, and while the embodiment has been described in considerable detail," to --While the present invention has been illustrated by the description of specific embodiments thereof, and while the embodiments have been described in considerable detail,--.

In the Claims

In Claim 12, Column 6, Lines 51-52, change "the second coupling structure having a shape complimentary to the first coupling structure" to --the second coupling structure having a shape complementary to the first coupling structure--.